March 14, 1967  E. GABBRIELLI  3,308,510

FILM EXTRUSION MILL

Filed July 2, 1965

Inventor

Ernesto Gabbrielli

United States Patent Office 3,308,510
Patented Mar. 14, 1967

3,308,510
FILM EXTRUSION MILL
Ernesto Gabbrielli, 9 Spechtweg, Lustenau, Austria
Filed July 2, 1965, Ser. No. 469,249
Claims priority, application Switzerland, July 7, 1964,
8,873/64
2 Claims. (Cl. 18—15)

This invention relates to film extrusion mills and similar shaping apparatus in which a plastically deformable material is extruded between a rotating roll and a stationary die member.

The rolls of conventional extrusion mills of the type described are subjected to high unbalanced radial stresses by the material being extruded, and must be made rigid enough to withstand such stresses without significant deformation which would cause the extrusion of film or sheeting much thicker in the middle than on the sides. Similar requirements for rigidity must be met by the bearings of the mill frame in which the rolls are journaled.

Conventional extrusion mills, therefore, are very heavy and correspondingly costly. It is an object of the invention to provide an extrusion mill which is lighter than the usual mills without loss in uniformity in the thickness of the extruded film or sheeting.

More specifically, the invention aims at providing an extrusion mill in which the radial stresses in the roll and in its bearings are substantially balanced.

With these and other objects in view, the extrusion mill of the invention, in one of its aspects, has a rotating roll and a fixed shell whose opposite faces define a compression chamber extending circumferentially about the axis of roll rotation. The width of the chamber is determined by the spacing of these opposite faces.

An axially elongated baffle is mounted on the shell in the compression chamber and is movable toward and away from the roll. The baffle divides the chamber into two circumferential compartments.

Figure 1:
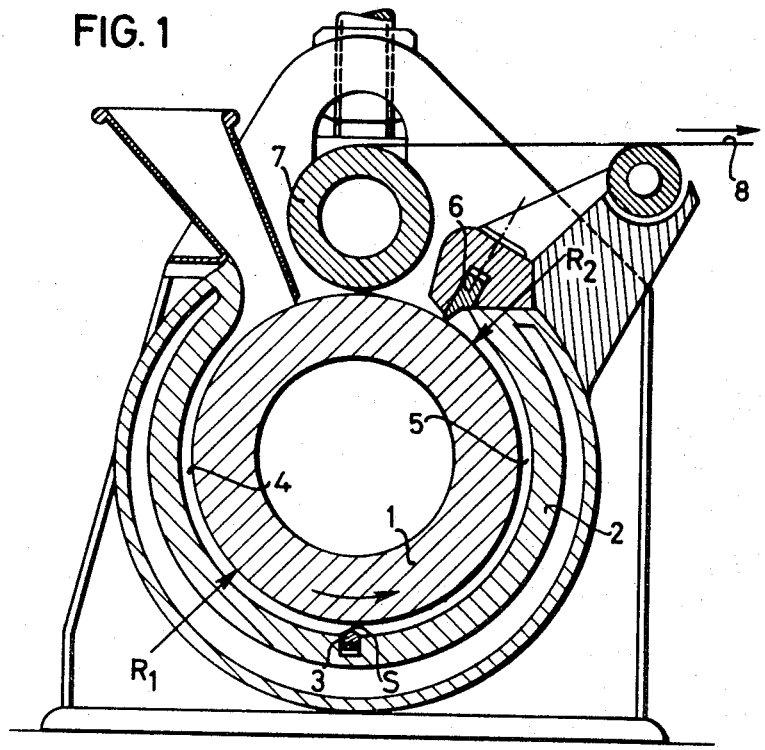
Figure 2:
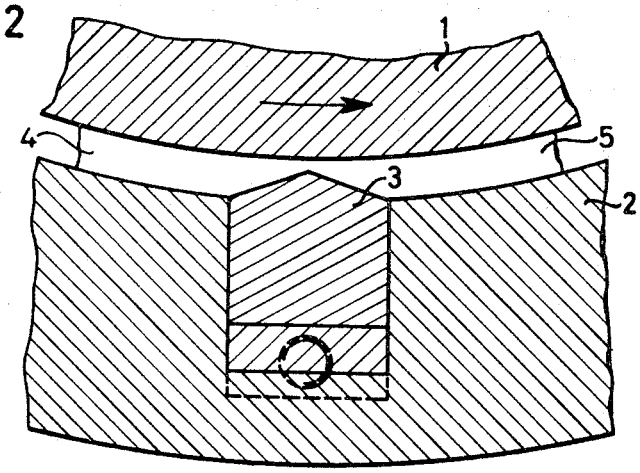

Other features and many of the attendant advantages of this invention will be readily appreciated as the same becomes better understood by reference to the following detailed description of a preferred embodiment when considered in connection with the accompanying drawing in which:

FIG. 1 shows an extrusion mill of the invention for the extrusion of thermoplastic film in side-elevational section; and FIG. 2 shows a detail of FIG. 1 on a larger scale.

A driven roll is journaled in the supporting mill frame 10 for rotation about a horizontal axis. A shell 2 fixedly fastened to the frame 10 coaxially envelops the sides and the bottom of the roll 1, and defines therewith a compression chamber 4, 5 which is a segment of a hollow cylinder. Cavities 11, 12 are provided for admitting a heating fluid to the roll 1 and shell 2 respectively.

A feed hopper 13 communicates with the trailing end of the compression chamer, the roll 1 being driven to rotate counterclockwise as viewed in FIG. 1. A radially adjustable blade 6 and the moving cylindrical surface of the roll form an extrusion die at the leading end of the chamber. The die opening is axially elongated and its width defines the thickness of the extruded plastic film 8.

A take-off roll 7 is mounted on the frame 10 by means of bearings 14 which can be shifted toward and away from the roll 1 by screws 15, only one bearing and the associated screw being shown.

The compression chamber is divided into two compartments 4, 5 by a baffle 3 which is a bar axially as long as the walls of the roll 1 and of the shell 2 which enclose the compression chamber. The baffle 3 is partly received in an axial groove of the shell 2 whose bottom 16 slopes gently toward the axis of the roll 1 from one axial end of the groove to the other. A control wedge 17 is conformingly interposed between the bottom 16 and the baffle bar 3. A screw 18 whose axis is parallel to the roll axis threadedly engages the wedge 17 and is secured against axial movement relative to the frame 10 in a conventional manner, not seen in the drawing.

The screw passes through a radially elongated slot in the shell 2, and the head of the screw abuttingly engages an outer surface of the frame 10. When the screw is turned, the wedge 17 moves axially along the groove bottom 16, thereby driving the top face of the baffle 3, which is of inverted V-shaped section, toward the roll 1 against the pressure of the material in the compression chamber, or permitting radially outward movement of the baffle under that pressure. The gap between the baffle 3 and the roll 1 may thus be precisely adjusted.

The vector $R_2$ (FIG. 1) indicates the forces which act on the roll 1 during rotation thereof due to pressure of the material in the compartment 5, and the pressure of the take-off roll 7. The compartments 4 and 5 are never completely filled with the viscous plastic material in normal extrusion practice. For any fixed rotary speed of the roll 1, the baffle 3 can therefore be set in such a manner that the radial component $R_1$ of the forces acting on the roll 1 because of the pressure in the compartment 4 is opposite and approximately equal to the vector $R_2$.

It is evident that a reduction in the size of the gap S increases the pressure in the compartment 4 and decreases the pressure in the compartment 5 under otherwise equal operating conditions. Under most circumstances, adjustment of gap width at a single baffle 3 is sufficient to reduce the resultant radial forces acting on the roll 1 to a negligible value. Bending of the roll 1 is thereby avoided, and the bearing pressure of the roll on the frame 10 is minimized.

The roll and the main bearings in the extrusion mill of the invention may therefore be made much lighter than in comparable conventional machinery. The thickness of the film is uniform in extruders of the invention which produce film of the greatest width currently produced on other machines, and such uniformity is easily maintained.

More than one baffle 3 may be provided where the material processed offers unusual problems, and such baffles are to be spaced from each other circumferentially on the inner wall of the shell to divide the compression chamber into more than two compartments.

While the circumferential faces of the roll 1 and of the shell 2 which define the width of the compression chamber 4, 5 therebetween have been shown to be generally coaxial some advantages of this invention can also be achieved with a compression chamber which tapers or flares in the direction of roll surface movement, which is also the direction of material flow through the chamber.

Obviously, many other modifications and variations of the present invention are possible in the light of the above teachings. It is therefore to be understood that, within the scope of the appended claims, the invention may be practiced otherwise than as specifically described.

It is also possible to fix several baffle-means 3 over the circumference in the shell 2 so as to have more than two compartments. Each baffle 3 has its wedge 17 and can be arranged to determine a gap S, so that the values of the pressures in these different compartments are different and the resulting disappears, i.e. all forces acting on the roll 1 are balanced even its weight. In that case practically no force will act on the bearings of the roll 1.

What I claim is:
1. In a pressure shaping apparatus, in combination:
  (a) a support;
  (b) a roll mounted on said support for rotation about an axis;

(c) a shell secured on said support against rotation and enveloping a portion of said roll,
  (1) respective opposite faces of said roll and of said shell defining therebetween a circumferentially extending chamber having two circumferentially terminal portions,
  (2) the spacing of said shell and of said roll determining the width of said chamber;
(d) axially extending baffle means mounted on said shell in said chamber between the terminal portions thereof for movement toward and away from said roll, said baffle means circumferentially dividing said chamber into two or more compartments, said baffle means including
  (1) an axially elongated member partly received in an axially elongated groove in said face of the shell, and
  (2) actuating means for actuating movement of said baffle member outward of said groove and toward said face of said roll against the pressure of a material in said chamber;
(e) feed means for feeding a material to be shaped to one of said terminal portions; and
(f) a shaping die at the other terminal portion.

2. In an apparatus as set forth in claim 1, said baffle member having an axial length approximately equal to the axial length of said opposite faces, and sealingly engaging said shell over said length.

References Cited by the Examiner
UNITED STATES PATENTS

| | | | |
|---|---|---|---|
| 1,537,348 | 5/1925 | Grossmann | 18—12 X |
| 1,844,972 | 2/1932 | Parkhurst | 18—12 |
| 2,845,656 | 8/1958 | Gabrielli | 18—2 X |
| 2,892,212 | 6/1959 | Rhodes | 18—12 |
| 3,142,091 | 7/1964 | Curtiss | 18—12 |

WILLIAM J. STEPHENSON, *Primary Examiner.*